(12) United States Patent
Yoon et al.

(10) Patent No.: US 9,989,689 B2
(45) Date of Patent: Jun. 5, 2018

(54) BACKLIGHT UNIT CAPABLE OF LOCAL DIMMING

(71) Applicant: Korea Advanced Institute of Science And Technology, Daejeon (KR)

(72) Inventors: Jun-Bo Yoon, Daejeon (KR); Seok-Won Bae, Daejeon (KR); Gun-Wook Yoon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 120 days.

(21) Appl. No.: 15/044,723

(22) Filed: Feb. 16, 2016

(65) Prior Publication Data

US 2017/0097456 A1    Apr. 6, 2017

(30) Foreign Application Priority Data

Oct. 2, 2015 (KR) .......................... 10-2015-0138941

(51) Int. Cl.
*F21V 7/04* (2006.01)
*F21V 8/00* (2006.01)

(52) U.S. Cl.
CPC ......... *G02B 6/0021* (2013.01); *G02B 6/0036* (2013.01); *G02B 6/0055* (2013.01); *G02B 6/0068* (2013.01); *G02B 6/0076* (2013.01); *G02B 6/0031* (2013.01)

(58) Field of Classification Search
CPC ... G02B 6/0068; G02B 6/0073; G02B 6/0075
USPC ...................................... 362/600, 612, 613
See application file for complete search history.

(56) References Cited

U.S. PATENT DOCUMENTS

| 8,092,064 B2* | 1/2012 | Erchak ................. G02B 6/0085 349/65 |
| 8,684,587 B2 | 4/2014 | Kim et al. |
| 2005/0270798 A1 | 12/2005 | Lee et al. |
| 2007/0230213 A1 | 10/2007 | Lee et al. |
| 2009/0129119 A1* | 5/2009 | Lee ..................... B29C 33/3842 362/619 |
| 2010/0208493 A1* | 8/2010 | Choi .................... G02B 6/0035 362/607 |

(Continued)

FOREIGN PATENT DOCUMENTS

| JP | 2011-023331 A | 2/2011 |
| JP | 2013-026213 A | 2/2013 |

(Continued)

OTHER PUBLICATIONS

Office Action dated May 20, 2016 in related Korean Appl. No. 10-2015-0138941 (5 pgs.).

(Continued)

*Primary Examiner* — Daniel St. Cyr
(74) *Attorney, Agent, or Firm* — Foley & Lardner LLP (57) ABSTRACT

A backlight unit may be provided which is capable of local dimming. The backlight unit includes: one or a plurality of light emitting devices; and a light guide plate including a top surface and a bottom surface, one or a plurality of grooves which are formed in the bottom surface and in which the light emitting device is disposed, a reflective layer which is disposed within the one or the plurality of grooves and reflects light emitted from the light emitting device, and a plurality of inverse prism patterns disposed in the top surface.

7 Claims, 4 Drawing Sheets

(56) References Cited

U.S. PATENT DOCUMENTS

2013/0016521 A1     1/2013   Jung et al.
2016/0266439 A1*   9/2016   Li .................... G02F 1/133603

FOREIGN PATENT DOCUMENTS

| JP | 2013-101973 A | 5/2013 |
|----|---|---|
| KR | 10-2008-0107801 A | 12/2008 |
| KR | 10-2009-0068859 A | 6/2009 |
| KR | 10-2011-0067535 A | 6/2011 |
| KR | 10-2012-0016972 A | 2/2012 |
| KR | 10-2013-0039406 A | 4/2013 |

OTHER PUBLICATIONS

Japanese Office Action in corresponding application received Jul. 25, 2017.

* cited by examiner

BACKLIGHT UNIT CAPABLE OF LOCAL DIMMING

BACKGROUND

Field

The present invention relates to a backlight unit, and more particularly to a backlight unit capable of local dimming.

Description of the Related Art

Since a liquid crystal display device is not able to emit light in itself, it requires a backlight unit for supplying light to the liquid crystal. Here, the liquid crystal display device is generally divided into a directly downward type and an edge type.

In the directly downward type, a light source is located below the light emitting surface of the light guide plate. Since the light source is arranged in a 2-dimensional manner, it is easy to perform the local dimming. However, the entire thickness of the liquid crystal display device is very large and a plurality of light sources (LED) are required. Therefore, the directly downward type is not suitable for mobile devices.

Meanwhile, in the edge type, the light source is located on the side of the light emitting surface of the light guide plate. Therefore, the entire thickness is small and it is possible to implement the backlight unit by means of a smaller number of the light sources. However, since the light source is located only on the side of the light emitting surface, it is difficult to perform the local dimming which divides the light emitting surface into a plurality of sections.

The patent document 1 relates to an edge type backlight unit using a light guide plate with an inverse prism structure on the light guide plate. According to the patent document 1, it is possible to form a backlight unit only by a single light guide plate without additional reflective sheet, diffusion sheet, and prism sheet. This enables to maximize the small thickness of the backlight unit, i.e., an advantage of the edge type. Also, since only one light guide plate is used, there are advantages in cost and efficiency by optical loss reduction. Although the edge type backlight unit using the inverse prism structure of the patent document 1 maximize the advantages of an existing edge type backlight unit, it is still difficult to perform the local dimming.

Meanwhile, the patent document 2 and the patent document 3 are disclosed to solve the limit of the local dimming instead of the thickness. The patent document 2 and the patent document 3 propose edge type backlight units capable of local dimming, and thus, focus on low power consumption and image quality improvement by a high contrast ratio. However, the backlight units disclosed in the patent document 2 and the patent document 3 are in common with each other in that the light is emitted to the front surface of the light guide plate by using the reflection pattern formed on the lower portion of the light guide plate. When the LEDs are disposed within the light guide plate, this causes a hot spot on the light guide plate in which each of the LEDs is included. As a result, when a user views the backlight unit, light uniformity is greatly reduced.

In order to solve the hot spot problem, it has been proposed that additional diffusion sheet and prism sheet are disposed on the light guide plate or each backlight unit is manufactured in the form of an assembled tile. However, according to these methods, it is complicated to individually form each of the backlight units and assembly them. Moreover, by using additional diffusion sheet and/or prism sheet, there are problems of increase of the entire thickness, cost increase, and optical loss at the interface between the sheets.

SUMMARY

One embodiment is a backlight unit capable of local dimming. The backlight unit includes: one or a plurality of light emitting devices; and a light guide plate including a top surface and a bottom surface, one or a plurality of grooves which are formed in the bottom surface and in which the light emitting device is disposed, a reflective layer which is disposed within the one or the plurality of grooves and reflects light emitted from the light emitting device, and a plurality of inverse prism patterns disposed in the top surface.

The plurality of grooves of the light guide plate may include: a plurality of first grooves formed in parallel in one direction; and a plurality of second grooves formed in the form of a grid with respect to the plurality of first grooves. The light emitting device may be disposed within the plurality of first grooves.

The light guide plate may include a plurality of blocks which are divided by the plurality of first grooves and the plurality of second grooves. A width of the plurality of second grooves may be smaller than an interval between two light emitting devices which are the closest to each other in two adjacent blocks among the plurality of blocks.

The light guide plate may include an upper surface and two sides which define the groove. The reflective layer may include an upper reflective layer which is disposed on the upper surface, and a side reflective layer which is disposed on any one of the two sides.

A width of the upper reflective layer may be greater than a width of the groove and may be smaller than an interval between two adjacent light emitting devices.

A width of the upper reflective layer may be the same as a width of the groove. The width of the groove may be smaller than an interval between two adjacent light emitting devices.

The backlight unit may further include a reflection plate disposed on the bottom surface of the light guide plate.

The backlight unit may further include a substrate on which the light emitting device is disposed. The substrate may be disposed within or outside the groove of the light guide plate.

The substrate may contact the reflective layer and transmit the light emitted from the light emitting device to the reflective layer.

A material of the plurality of inverse prism patterns may be the same as a material of the light guide plate.

A material of the plurality of inverse prism patterns may be different from a material of the light guide plate.

The light guide plate may include a lower light guide plate and an upper light guide plate disposed on the lower light guide plate. The plurality of inverse prism patterns may be disposed on the upper light guide plate. A material of the upper light guide plate may be the same as the material of the plurality of inverse prism patterns.

DETAILED DESCRIPTION

Hereinafter, an exemplary embodiment of the present invention will be described in detail with reference to the accompanying drawings. It is noted that the same reference numerals are used to denote the same elements throughout the drawings. In the following description of the present invention, the detailed description of known functions and configurations incorporated herein is omitted when it may make the subject matter of the present invention unclear.

Hereinafter, a backlight unit capable of local dimming according to an embodiment of the present invention will be described with reference to the accompanying drawings.

Figure 1:
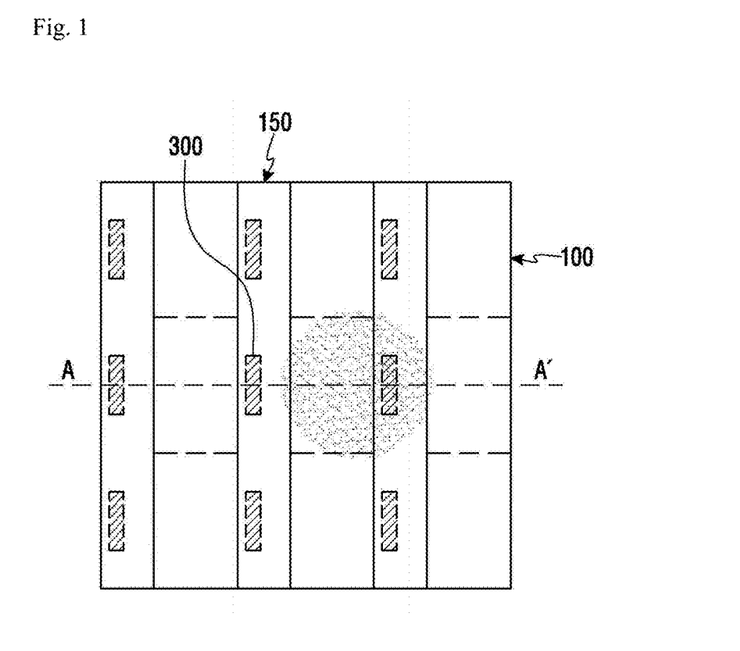
FIG. 1 is a top view of a backlight unit capable of local dimming according to an embodiment of the present invention.
Figure 2:
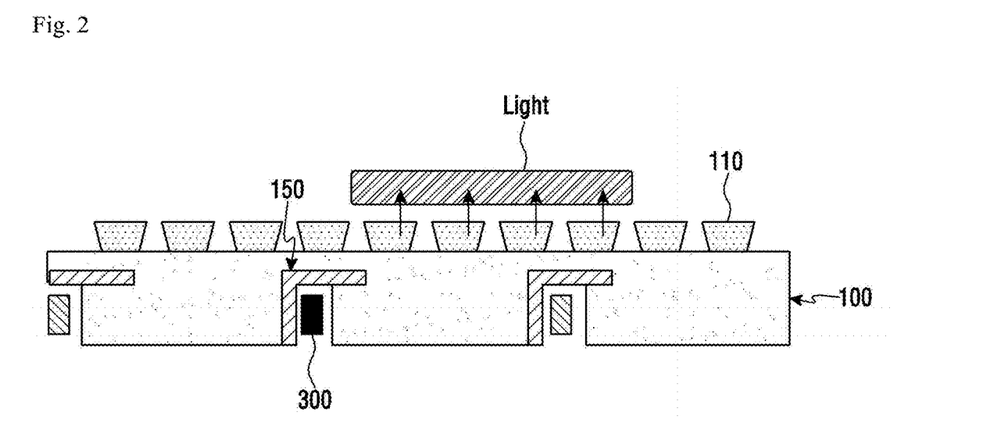
FIG. 2 is a cross sectional view taken along line A-A' of the backlight unit which is shown in FIG. 1 and capable of local dimming.
Figure 3:
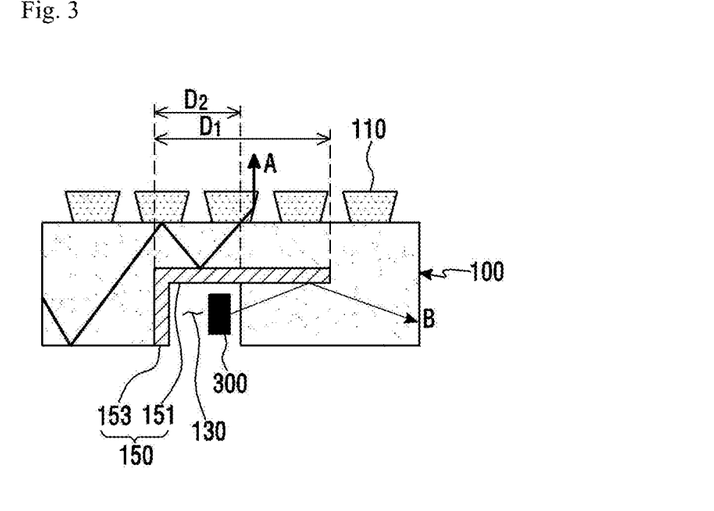
FIG. 3 is an enlarged view of a portion of the backlight unit which is shown in FIG. 2 and capable of local dimming.

FIG. 1 is a top view of a backlight unit capable of local dimming according to the embodiment of the present invention. FIG. 2 is a cross sectional view taken along line A-A' of the backlight unit which is shown in FIG. 1 and capable of local dimming. FIG. 3 is an enlarged view of a portion of the backlight unit which is shown in FIG. 2 and capable of local dimming.

Referring to FIGS. 1 to 3, the backlight unit capable of local dimming according to the embodiment of the present invention includes a light guide plate 100 and a light emitting device 300.

The light guide plate 100 includes a top surface, a bottom surface, and a plurality of sides. The plurality of sides may be disposed between the top surface and the bottom surface.

The light guide plate 100 includes an inverse prism pattern 110.

The inverse prism pattern 110 may be disposed on the light guide plate 100. A plurality of the inverse prism patterns 110 may be disposed on the top surface of the light guide plate 100. The plurality of inverse prism patterns 110 may be arranged on the top surface of the light guide plate 100 in a plurality of columns and rows. Two adjacent inverse prism patterns among the plurality of inverse prism patterns 110 may be disposed apart from each other at a predetermined interval.

The material of the inverse prism pattern 110 may be the same as that of the light guide plate 100 and may be formed integrally with the light guide plate 100. If the material of the inverse prism pattern 110 is different from that of the light guide plate 100, optical loss may occur at the interface between the two different materials. Also, due to Fresnel reflection or interface roughness, etc., the light travel efficiency in a direction in which the light originally intends to travel may be reduced. However, when the material of the inverse prism pattern 110 is the same as that of the light guide plate 100, there is no interface between the two materials, so that no optical loss occurs and the light travel efficiency can be improved.

However, the material of the inverse prism pattern 110 is not limited to be the same as that of the light guide plate 100, and the material of the inverse prism pattern 110 may be different from that of the light guide plate 100. For example, the material of the inverse prism pattern 110 may be a process material which makes it easier to fabricate a fine structure, such as photoresist (PR) or PDMS, etc., and the material of the light guide plate 100 may be a solid material capable of large area manufacturing, such as glass, PMMA, or acrylic material, etc. The inverse prism pattern 110 may be coupled or attached to the top surface of the light guide plate 100. As described above, when the material of the inverse prism pattern 110 is different from that of the light guide plate 100, optical loss may occur at the interface between the two materials. However, the existence of the material which can be used in common in the inverse prism pattern 110 and in the light guide plate 100 is extremely limited. Actually, since the properties of the material of the light guide plate 100 are partially different from the properties of the material which can be easily used in the formation of the inverse prism pattern 110, it is easier to individually form the inverse prism pattern 110 and the light guide plate 100 in actually manufacturing them.

The inverse prism pattern 110 is able to complement the light uniformity reduction caused by a reflective layer 150. A detailed description of this will be provided later.

The inverse prism pattern 110 is able to function as a diffusion sheet which uniformly maintains the light uniformity. Therefore, the backlight unit according to the embodiment of the present invention does not require a separate diffusion sheet.

The light guide plate 100 has a groove 130.

The groove 130 may be formed in the lower portion of the light guide plate 100. The groove 130 may be formed in the bottom surface of the light guide plate 100, has a predetermined length in one direction of the light guide plate 100, and has a predetermined width in a direction perpendicular to the one direction. The light guide plate 100 includes one upper surface and two sides which define the groove 130.

A plurality of the grooves 130 may be formed in the bottom surface of the light guide plate 100. The plurality of grooves 130 will be described with reference to FIGS. 4 to 6.

Figure 4:
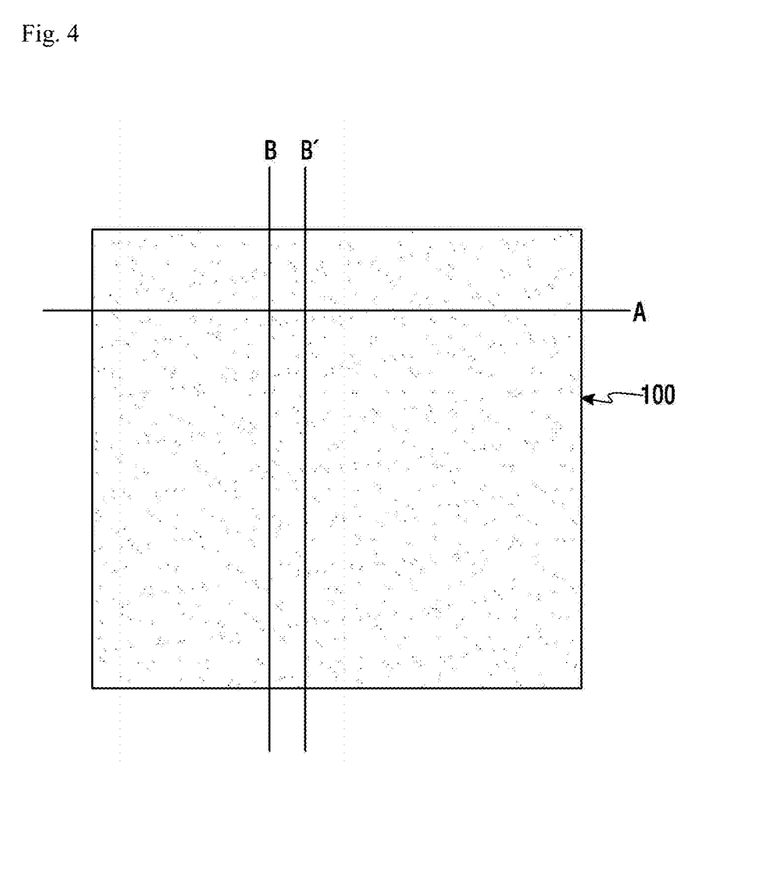
FIG. 4 is a top view of a light guide plate 100 shown in FIG. 2.
Figure 5:
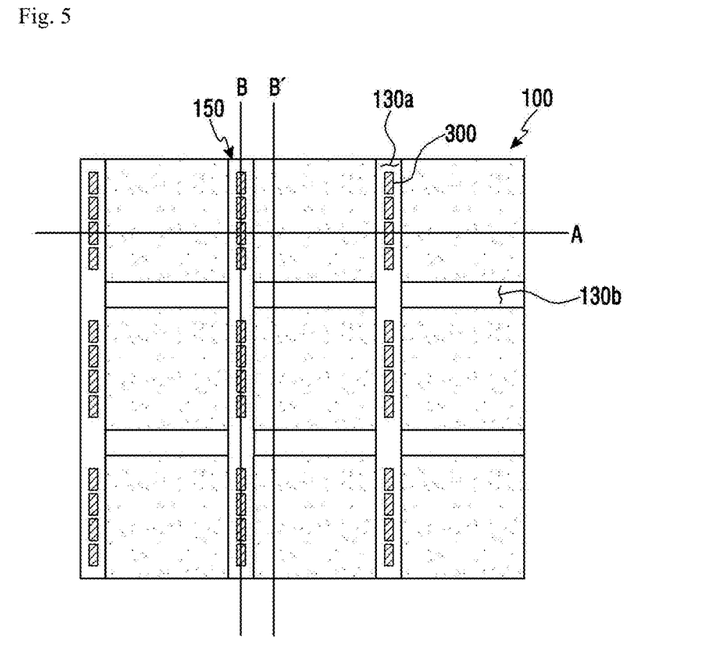
FIG. 5 is a bottom view of the light guide plate 100 shown in FIG. 2.
Figure 6:
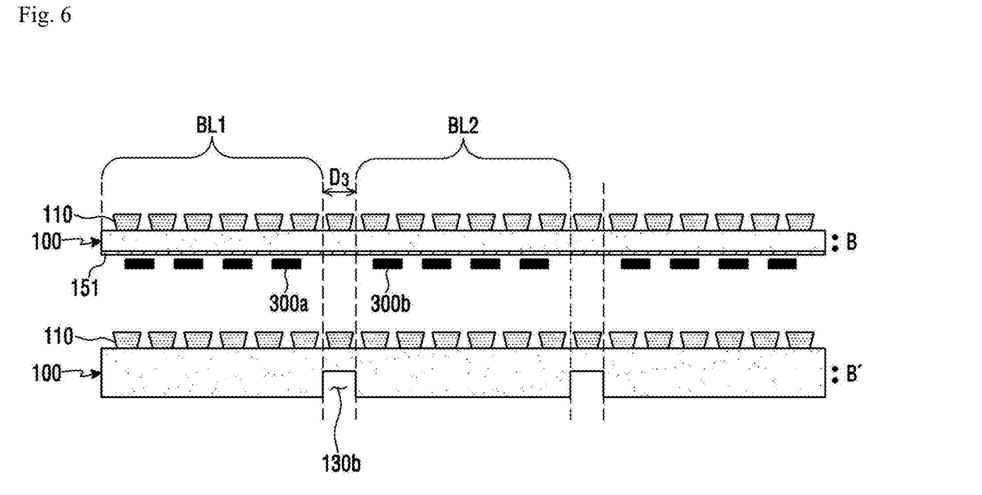
FIG. 6 shows cross sections taken along lines B and B' shown in FIGS. 4 and 5.

FIG. 4 is a top view of the light guide plate 100 shown in FIG. 2. FIG. 5 is a bottom view of the light guide plate 100 shown in FIG. 2. FIG. 6 shows cross sections taken along lines B and B' shown in FIGS. 4 and 5.

Referring to FIGS. 4 to 6, the plurality of grooves 130 include a plurality of first grooves 130a formed in parallel in one direction and a plurality of second grooves 130b formed in a direction perpendicular to the one direction.

The plurality of first grooves 130a and the plurality of second grooves 130b may be formed in the form of a grid.

The reflective layer 150 and one or a plurality of the light emitting devices 300 are disposed in the plurality of first grooves 130a. The light emitting device 300 is not disposed in the plurality of second grooves 130b. Therefore, the plurality of grooves 130 in FIGS. 1 to 3 mean the plurality of first grooves 130a. Due to the plurality of first grooves 130a and the plurality of second grooves 130b arranged in the form of a grid, the light guide plate 100 may have a plurality of blocks BL1 and BL2.

A width D3 of the plurality of second grooves 130b may be smaller or greater than the thickness of the light guide plate 100.

The width D3 of the plurality of second grooves 130b is smaller than an interval between two adjacent light emitting devices 300a and 300b which are the closest to each other in two adjacent blocks BL1 and BL2. Here, the two light emitting devices 300a and 300b which are the closest to each other in the two adjacent blocks BL1 and BL2 mean the light emitting device 300a which is located at the outermost of one block BL1, and mean the light emitting device 300b, which is the closest to the light emitting device 300a, in another adjacent block BL2. When the local dimming is performed through the plurality of second grooves 130b, the light is intended to be guided only in a desired block section, so that an image quality with a high contrast ratio can be obtained. This is because since a reflective index of the material of the light guide plate 100 is different from that of a material filling the second groove 130b, total reflection occurs at the interface between the two materials, so that the high refraction angle prevents a considerable amount of light from leaking to the adjacent block.

With back reference to FIGS. 1 to 3, the light guide plate 100 includes the reflective layer 150.

The reflective layer 150 is disposed in the groove 130 of the light guide plate 100. The reflective layer 150 may be a metal layer. As shown in FIG. 3, the reflective layer 150 includes an upper reflective layer 151 which is disposed on the upper surface among the upper surface and two sides which define the groove 130 of the light guide plate 100, and a side reflective layer 153 which is disposed on the side of the light guide plate.

The upper reflective layer 151 removes a hot spot caused by the light emitting device 300. The upper reflective layer 151 is able to remove the hot spot by blocking the light emitting from the light emitting device 300 to the top surface of the light guide plate 100. Here, although the hot spot caused by the light emitting device 300 is removed by the upper reflective layer 151, the light emitting upward from the light emitting device 300 is blocked by the upper reflective layer 151. Therefore, it is difficult to maintain the light uniformity in a light emitting surface of the light guide plate 100. The light uniformity can be maintained by the inverse prism pattern 110. Even though the light from the light emitting device 300 is blocked by the upper reflective layer 151, the light emitted from another adjacent light emitting device is reflected from the top surface of the upper reflective layer 151 along the path "A" shown in FIG. 3 and is emitted by the inverse prism pattern 110, so that the light uniformity can be maintained as it is. Therefore, the inverse prism pattern 110 is able to compensate for the light uniformity degradation.

As indicated by a path "B" shown in FIG. 3, the upper reflective layer 151 may reflect the light emitted from the light emitting device 300 to another adjacent light emitting device or to the side of the light guide plate 100.

It is desirable that a width D1 of the upper reflective layer 151 should be, as shown in FIG. 3, greater than a width D2 of the groove 130 and be, as shown in FIG. 2, smaller than the interval between two adjacent light emitting devices 300. If the width D1 of the upper reflective layer 151 is smaller than the width D2 of the groove 130, the hot spot caused by the light emitting device 300 cannot be sufficiently removed and it is difficult to maintain the light uniformity as it is. If the width D1 of the upper reflective layer 151 is the same as or greater than the interval between two adjacent light emitting devices 300, the light emitted from the light emitting device 300 cannot reach the inverse prism pattern 110 of the light guide plate 100.

The width D1 of the upper reflective layer 151 is selectively controlled within the above range, so that the light uniformity can be controlled.

Meanwhile, the width D1 of the upper reflective layer 151 may be the same as the width D2 of the groove 130. This will be described in detail with reference to FIG. 7.

Figure 7:
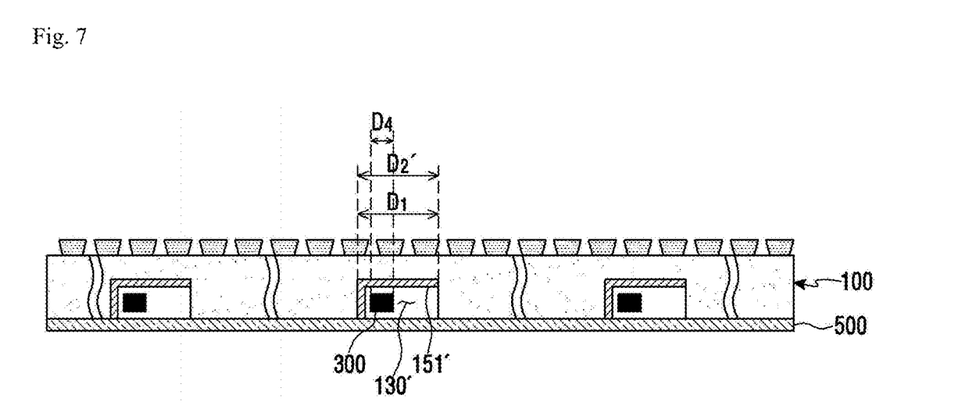
FIG. 7 is a cross sectional view showing a modified example of an upper reflective layer 151 shown in FIG. 3.

FIG. 7 is a cross sectional view showing a modified example of the upper reflective layer 151 shown in FIG. 3.

Referring to FIG. 7, a width D1 of an upper reflective layer 151' is the same as a width D2' of a groove 130'. However, the width D2' of the groove 130' is greater than the width D2 of the groove 130 shown in FIG. 3. It is desirable that the width D2' of the groove 130' should be, as shown in FIG. 2, smaller than the interval between two adjacent light emitting devices 300.

While it may be difficult to manufacture the upper reflective layer 151 shown in FIG. 3, the upper reflective layer 151' shown in FIG. 7 can be easily manufactured by patterning.

The backlight unit including the upper reflective layer 151' shown in FIG. 7 may further include a reflection plate 500.

The reflection plate 500 may be disposed on the bottom surface of the light guide plate 100. The reflection plate 500 may be disposed below the groove 130 and may form a total reflection guide path which guides the light emitted from the light emitting device 300 to be incident on the light guide plate 100.

Referring back to FIGS. 1 to 3, the side reflective layer 153 prevents the light traveling within the light guide plate 100 from coming out of the light guide plate 100 through the groove 130. The side reflective layer 153 reduces optical loss within the light guide plate 100, so that larger amount of the light is emitted through the inverse prism pattern 110 of the light guide plate 100. Accordingly, the backlight unit according to the embodiment of the present invention can obtain high optical efficiency by the side reflective layer 153.

Figure 8:
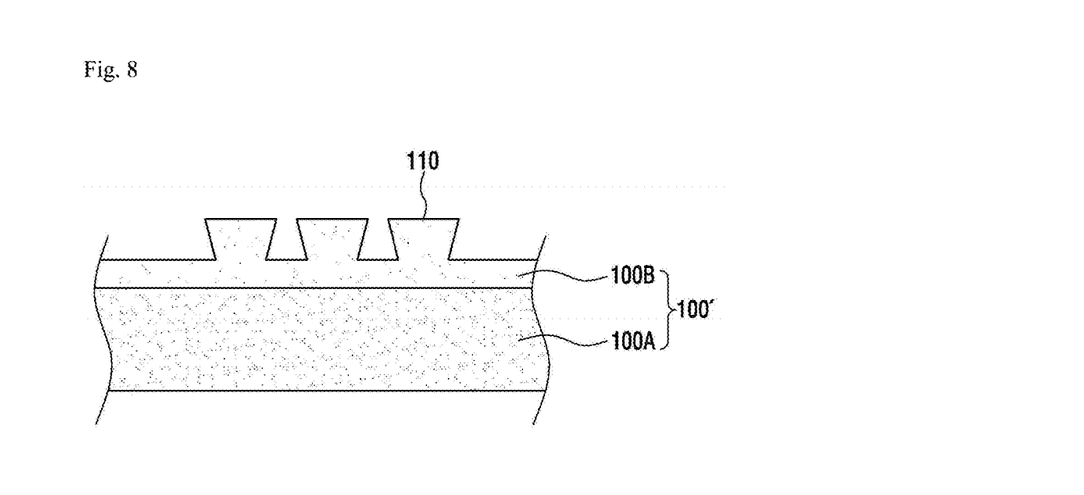
FIG. 8 is a cross sectional view showing a modified example of the light guide plate shown in FIG. 2 or 7.

FIG. 8 is a cross sectional view showing a modified example of the light guide plate shown in FIG. 2 or 7.

Referring to FIG. 8, a light guide plate 100' may include a lower light guide plate 100A and an upper light guide plate 100B.

The upper light guide plate 100B is disposed on the lower light guide plate 100A. Specifically, the upper light guide plate 100B may be disposed on the top surface of the lower light guide plate 100A.

The plurality of inverse prism patterns 110 are disposed on the upper light guide plate 100B. Specifically, the plurality of inverse prism patterns 110 may be disposed on the top surface of the upper light guide plate 100B.

The material of the upper light guide plate 100B is the same as that of the plurality of inverse prism patterns 110. The material of the upper light guide plate 100B may be different from that of the lower light guide plate 100A.

The light guide plate 100' shown in FIG. 8 may have the following advantages.

When the inverse prism pattern 110 is, as shown in FIG. 2, formed on the top surface of the light guide plate 100, the light guide plate 100 may be corroded or cracked by predetermined chemicals which are used to form the inverse prism pattern 110. However, the light guide plate 100' shown in FIG. 8 may be manufactured by forming the inverse prism pattern 110 on the upper light guide plate 100B and then by attaching the upper light guide plate 100B to the lower light guide plate 100A. In this case, the lower light guide plate 100A can be prevented in advance from being corroded or cracked due to the chemicals.

When the inverse prism pattern 110 is formed on the top surface of the upper light guide plate 100B in the state where the upper light guide plate 100B is disposed on the lower light guide plate 100A, the chemicals which are used to form the inverse prism pattern 110 are prevented from contacting the lower light guide plate 100A by the upper light guide plate 100B. Therefore, it is possible to prevent the lower light guide plate 100A from being attacked by the chemicals.

When the inverse prism pattern 110 is, as shown in FIG. 2, formed on the top surface of the light guide plate 100, it is inconvenient and takes a long time to attach the inverse prism pattern 110 to the top surface of the light guide plate 100 one by one. However, the light guide plate 100' shown in FIG. 8 is manufactured by forming the plurality of inverse prism patterns 110 on the thin upper light guide plate 100B and then by attaching the upper light guide plate 100B on the top surface of the lower light guide plate 100A. Therefore, the manufacturing process thereof is easy and manufacturing time can be significantly reduced.

Referring back to FIGS. 1 to 3, one or the plurality of light emitting devices 300 are disposed in the groove 130 of the light guide plate 100. Here, the light emitting device 300 may be, as described in FIG. 5, disposed in the plurality of first grooves 130a and may not be disposed in the plurality of second grooves 130b.

The light emitting device 300 may include a light emitting diode (LED) chip emitting red, green or blue light and a light emitting diode (LED) chip emitting ultraviolet light. Here, the light emitting diode (LED) chip may have a lateral type, a vertical type or a Flip-chip type, etc.

The light emitting device 300 may include a lens (not shown). The lens may be disposed to cover the LED chip. The lens is able to control the orientation angle or direction of the light emitted from the LED chip. The lens may be formed to include a light-transmitting resin such as a silicone resin or an epoxy resin. The light-transmitting resin may include a wholly or partially distributed phosphor. The lens has a flat light emitting surface, a hemispherical cross-section, or a partially convex or concave portion, etc. However, the shape of the lens is not limited to this.

When the LED chip within the light emitting device 300 is a blue light emitting diode, a phosphor included in the light-transmitting resin may include at least any one of garnet based phosphor (YAG, TAG), silicate based phosphor, nitride based phosphor and oxynitride based phosphor.

It is possible to create natural sunlight (white light) by including only yellow phosphor to the light-transmitting resin. Additionally, green phosphor or red phosphor may be further included in order to improve a color rendering index and to reduce a color temperature.

The garnet phosphor (YAG), the silicate phosphor and the oxynitride phosphor may be used as the yellow phosphor. The silicate phosphor and the oxynitride phosphor may be used as the green phosphor. The nitride phosphor may be used as the red phosphor. However, these phosphors are not limited to this.

The light emitting device 300 may be a high voltage light emitting diode (HV LED) package which is driven by direct current or alternating current. The HV LED package is formed by a process in which a plurality of LED chips are connected in series or in series/in parallel and disposed within one package body. Since a driving voltage of a typical LED is lower than 3 V, the typical LED is not available for high voltage alternating current of 220 V for family use. However, since the light emitting device 300 is the HV LED package which is driven by alternating current and includes the plurality of LED chips connected in series or in series/in parallel, the light emitting device 300 can be driven by high voltage alternating current such as a household alternating current power source or a commercial alternating current power source.

The backlight unit according to the embodiment of the present invention may further include a substrate (not shown) on which the light emitting device 300 is disposed. The substrate (not shown) may be disposed within the groove 130 of the light guide plate 100 or may be disposed outside the groove 130 of the light guide plate 100.

When the substrate (not shown) is disposed in the groove 130 of the light guide plate 100, one or the plurality of light emitting device 300 may be disposed on one side of the substrate (not shown), and the side reflective layer 153 may be disposed to contact the other side of the substrate (not shown). When the other side of the substrate (not shown) contacts the side reflective layer 153, heat emitted from the light emitting device 300 may be radiated through the side reflective layer 153. Meanwhile, the other side of the substrate (not shown) may be disposed apart from the side reflective layer 153 at a predetermined interval.

When the substrate (not shown) is disposed outside the groove 130 of the light guide plate 100, the substrate (not shown) may be disposed on the bottom surface of the light guide plate 100. In this case, one or the plurality of light emitting device 300 may be disposed on the top surface of the substrate (not shown), and a reflective layer may be disposed on the top surface of the substrate (not shown) in order to reflect the light emitted from the light emitting device 300.

The substrate (not shown) may be made by printing a circuit pattern on an insulator. For example, the substrate (not shown) may include a common printed circuit board (PCB), a metal core PCB, a flexible PCB, a ceramic PCB or the like. Also, the substrate (not shown) may be an insulating sheet in which the circuit pattern has been printed.

As such, in the backlight unit capable of local dimming according to the embodiment of the present invention, the light emitted from the light emitting device 300 located in the groove 130 within the light guide plate 100 is incident within the light guide plate 100 through one side of the light guide plate 100, which defines the groove 130. Here, the light travels within the light guide plate 100 by the total reflection. When the traveling light is incident on the inverse prism pattern 110 disposed on the light guide plate 100, the light is not totally reflected again to the inside of the light guide plate 100 by a slope of the inverse prism pattern 110 and is emitted to the outside of the light guide plate 100. When there is no reflective layer 150 within the groove 130 of the light guide plate 100, the amount of the light from a portion of the light guide plate, in which the light emitting device 300 is located, becomes greater than that of other portions. However, the reflective layer 150 disposed above the light emitting device 300 blocks the light emitted upward from the light emitting device 300, thereby solving the hot spot, i.e., a cause of glare. Here, although the reflective layer 150 makes it difficult to maintain the light uniformity of the light guide plate 100 as it is, the light emitted from another light emitting device 300 adjacent to the light emitting device 300 blocked by the reflective layer 150 is reflected from the top surface of the reflective layer 150 by the inverse prism pattern 110, so that light emission characteristics can be obtained by the inverse prism pattern 110.

While the embodiment of the present invention has been described with reference to the accompanying drawings, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A backlight unit capable of local dimming, the backlight unit comprising:
    one or a plurality of light emitting devices; and
    a light guide plate comprising
        a top surface and a bottom surface,
        one or a plurality of grooves which are formed in the bottom surface and in which a light emitting device is disposed,
        a reflective layer which is disposed within the one or the plurality of grooves and reflects light emitted from the light emitting device, and
        a plurality of inverse prism patterns disposed in the top surface,
    wherein the light guide plate includes an upper surface and two sides which define a groove,
    wherein the reflective layer includes an upper reflective layer which is disposed on the upper surface of the light guide plate, and a side reflective layer which is disposed on one of the two sides of the light guide plate, and
    wherein a width of the upper reflective layer is greater than a width of the groove.

2. The backlight unit capable of local dimming of claim 1, wherein the plurality of grooves of the light guide plate comprise:
    a plurality of first grooves formed in parallel in one direction; and
    a plurality of second grooves formed in the form of a grid with respect to the plurality of first grooves,
    wherein the light emitting device is disposed within the plurality of first grooves.

3. The backlight unit capable of local dimming of claim 1, further comprising a reflection plate disposed on the bottom surface of the light guide plate.

4. The backlight unit capable of local dimming of claim 1, wherein a material of the plurality of inverse prism patterns is the same as a material of the light guide plate.

5. The backlight unit capable of local dimming of claim 1, wherein a material of the plurality of inverse prism patterns is different from a material of the light guide plate.

6. The backlight unit capable of local dimming of claim 5, wherein the light guide plate comprises a lower light guide plate and a upper light guide plate disposed on the lower light guide plate,
    wherein the plurality of inverse prism patterns are disposed on the upper light guide plate, and
    wherein a material of the upper light guide plate is the same as the material of the plurality of inverse prism patterns.

7. The backlight unit capable of local dimming of claim 1, wherein the light guide plate has an insertion groove,
    wherein a portion of the upper reflective layer is inserted into the insertion groove, and wherein a shape of the insertion groove corresponds to a shape of the portion of the upper reflective layer.

* * * * *